(12) United States Patent
Martinez et al.

(10) Patent No.: US 10,025,576 B2
(45) Date of Patent: Jul. 17, 2018

(54) METHOD FOR DEPLOYING BIOS INTEGRITY MEASUREMENT VIA BIOS UPDATE PACKAGE AND SYSTEM THEREFOR

(71) Applicant: Dell Products, LP, Round Rock, TX (US)

(72) Inventors: Ricardo L. Martinez, Leander, TX (US); Balasingh P. Samuel, Round Rock, TX (US); Richard M. Tonry, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 14/796,864

(22) Filed: Jul. 10, 2015

(65) Prior Publication Data

US 2017/0010875 A1    Jan. 12, 2017

(51) Int. Cl.
*G06F 9/44* (2018.01)
*G06F 9/445* (2018.01)
*G06F 8/61* (2018.01)
*G06F 21/57* (2013.01)
*G06F 21/60* (2013.01)
*G06F 9/4401* (2018.01)

(52) U.S. Cl.
CPC .............. *G06F 8/61* (2013.01); *G06F 21/575* (2013.01); *G06F 21/60* (2013.01); *G06F 9/4401* (2013.01)

(58) Field of Classification Search
None
See application file for complete search history.

(56) References Cited

U.S. PATENT DOCUMENTS

| | | | |
|---|---|---|---|
| 6,829,355 B2 | 12/2004 | Lilly | |
| 2011/0113181 A1* | 5/2011 | Piwonka | G06F 8/65 711/102 |
| 2011/0185304 A1* | 7/2011 | Conzola | G06F 3/0481 715/772 |
| 2014/0188949 A1* | 7/2014 | Martinez | G06F 17/30097 707/821 |

OTHER PUBLICATIONS

Federal Information Processing Standards Publication, FIPS PUB 180-4, Secure Hash Standard, National Institute of Standards Technology, Mar. 2012, pp. 1-37.
Regenscheid et al., National Institute of Standards Technology, Special Publication 800-155, BIOS Integrity Measurement Guidelines (Draft); Dec. 2011, pp. 1-47.

* cited by examiner

*Primary Examiner* — Qamrun Nahar
(74) *Attorney, Agent, or Firm* — Larson Newman, LLP (57) ABSTRACT

A BIOS delivery installation package includes a basic input/output system (BIOS) update payload including a BIOS image. The BIOS delivery installation package also includes a first hash corresponding to a portion of the BIOS image.

20 Claims, 6 Drawing Sheets

METHOD FOR DEPLOYING BIOS INTEGRITY MEASUREMENT VIA BIOS UPDATE PACKAGE AND SYSTEM THEREFOR

FIELD OF THE DISCLOSURE

This disclosure generally relates to information handling systems, and more particularly relates to deploying a BIOS integrity measurement via a BIOS update package.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

FIGS. 1-6 illustrate techniques for distributing basic input/output system (BIOS) integrity measurements using a BIOS update package, such as a BIOS update executable, a Unified Extensible Firmware Interface (UEFI) capsule, and the like. In particular, a supplier of an information handling system, such as an original equipment manufacturer (OEM), can include one or more integrity measurements in the same package used to distribute BIOS software. In one embodiment, the integrity measurement can correspond to a value that is generated and stored at a platform configuration register (PCR0 in particular) as promulgated by a computer industry consortium, the Trusted Computing Group (TCG). As defined by the TCG, verification of the system BIOS integrity can be performed at runtime based on integrity measurements collected by the BIOS during system initialization. According to the TCG standard, the integrity measurement is stored in a trusted platform module (TPM) included at the information handling system. The PCR0 integrity measurement is a hash generated based on software instructions included in the BIOS. As disclosed herein, a supplier can generate the PCR0 hash and distribute the hash along with the corresponding BIOS image in a single BIOS update package. In another embodiment, the BIOS update package can include other BIOS validation hashes, as described in detail below.

Figure 1:
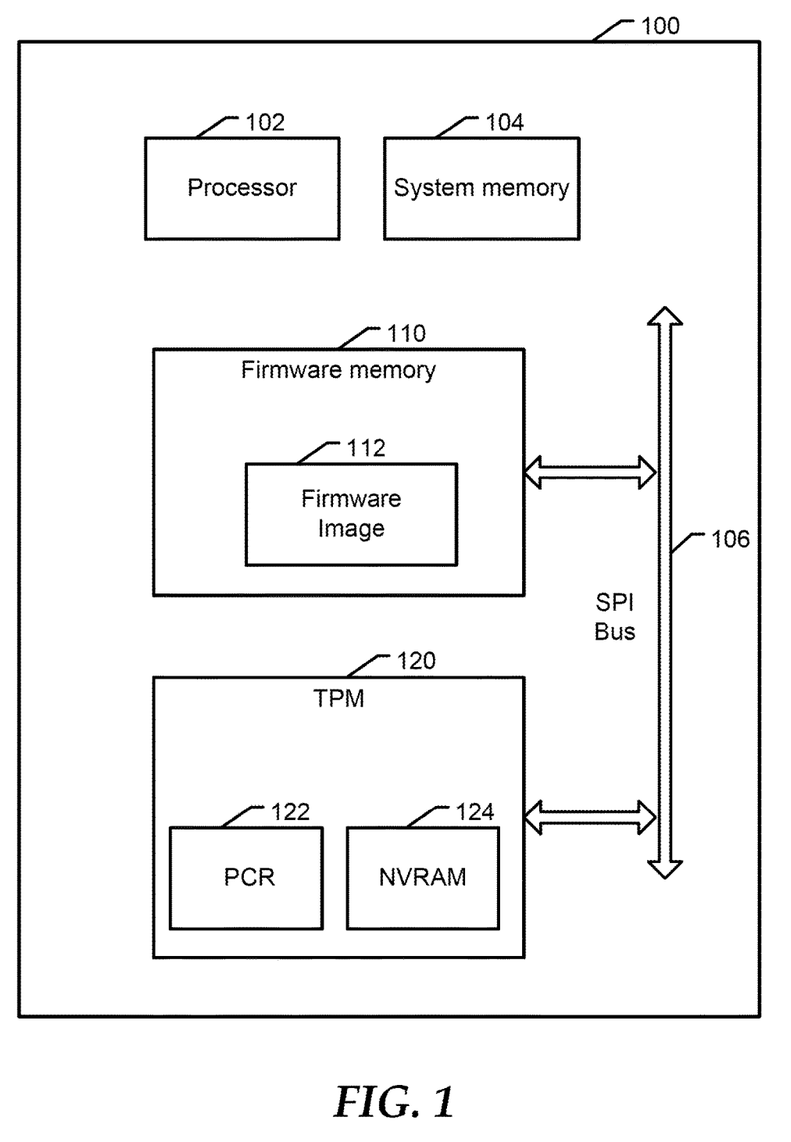
FIG. 1 is a block diagram illustrating an information handling according to a specific embodiment of the present disclosure.

FIG. 1 shows an information handling system 100 including a processor 102, system memory 104, a Serial Peripheral Interface (SPI) bus 106, a firmware memory 110, and TPM 120. Firmware memory 110 can include a non-volatile random access memory (NVRAM), and is configured to store a firmware image 112. Firmware image 112 is historically referred to as a BIOS, and the term BIOS is herein used interchangeably with the term firmware image. Firmware image 112 generally includes a collection of firmware routines, device drivers, and other software programs, and is further described below. TPM 120 includes platform configuration registers (PCR) 122 and a secure storage NVRAM 124. The information handling system can include additional hardware components and additional buses operable to transmit information between the various hardware components. For example, information handling system 100 can include one or more network interface controllers, peripheral component controllers and interconnects, video display controllers, and the like. The information handling system 100 can further include a service processor, such as the Baseband Management Controller (not shown at FIG. 1) to enable remote monitoring and management of aspects of the information handling system 100. SPI bus 106 is a synchronous serial data link that operates in full duplex mode. It is used for short distance, single master communication, for example in embedded systems, sensors, and SD cards. Devices communicate over the SPI bus in master/slave mode where the master device initiates the data frame. While SPI bus 106 is illustrated at FIG. 1, another bus technology can be used to communicate with TPM 120 and/or firmware memory 110.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Firmware image 112 is configured to initialize and test the system hardware components, and to load a boot loader or an operating system (OS) from a mass memory device. Firmware image 112 additionally provides an abstraction layer for the hardware, i.e. a consistent way for application programs and operating systems to interact with the keyboard, display, and other input/output devices. Variations in the system hardware are hidden by the BIOS from programs that use BIOS services instead of directly accessing the hardware. When power is first applied to information handling system 100, the system begins a sequence of initialization procedures during which components of the system are configured and enabled for operation. During the initialization sequence, also referred to as a boot sequence, device drivers associated with devices included at the system 100 can be installed. Device drivers provide an interface through which other components of the system 100 can communicate with a corresponding device.

In an embodiment, the firmware image 112 at the information handling system 100 can be substantially compliant with one or more revisions of the UEFI specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system having configurable firmware and one or more firmware images 112.

The firmware image 112 can be stored in firmware memory 110. A particular firmware image is typically assigned a revision number identifying the collection of firmware routines included in the firmware image. An OEM can provide updates to firmware image 112 that include improvements, corrections to address errata, and other revisions. These updates typically constitute a complete firmware image having a new revision number. A firmware update operation can include replacing the current instructions stored at firmware memory 110 with new instructions. In one embodiment, the software program is executed when information handling system 100 is under the control of an OS. For example, a BIOS update program can download a new firmware image and store the image in system memory 104. During a subsequent reboot at the information handling system 100, the previously existing firmware image can be erased and the updated firmware image can be stored at firmware memory 110.

TPM 120 is compliant with an international standard for a secure cryptoprocessor. TPM 120 can include a dedicated microprocessor designed to secure hardware by integrating cryptographic keys into devices. The TPM technical specification was written by the TCG consortium. A TPM, such as TPM 120, can include a microchip designed to provide basic security-related functions, primarily involving encryption keys. The TPM is usually installed on the motherboard of a computer, such as information handling system 100, and communicates with the rest of the system by using a hardware bus, such as SPI bus 106. TPM 120 can create cryptographic keys and encrypt them so that they can only be decrypted by TPM 120. This process, often called "wrapping" or "binding" a key, can help protect the key from disclosure. TPM 120 can provide a master "wrapping" key, called the storage root key, which is stored within the TPM itself. The private portion of a key created at TPM 120 is never exposed to any other component, software, process, or person. TPM 120 can also create a key that has not only been wrapped but is also tied to certain platform measurements. This type of key can only be unwrapped when those platform measurements have the same values that they had when the key was created. This process is called "sealing" the key to the TPM. Decrypting the key is called "unsealing." TPM 120 can also seal and unseal data generated outside of the TPM. With this sealed key and software such as BitLocker Drive Encryption, data can be locked until specific hardware or software conditions are met. Private portions of key pairs are kept separate from the memory controlled by the operating system. Keys can be sealed to the TPM, and certain assurances about the state of a system can be made before the keys are unsealed and released for use.

During the boot process, TPM 120 can measure (hash) all the critical software and firmware components, including the BIOS, boot loader, and operating system kernel, before they are loaded. By making these measurements before the software runs and storing them on TPM 120, the measurements are isolated and secure from subsequent modification attempts. Measurements can be of code, data structures, configuration, information, or anything that can be loaded into memory. The TCG requires that code not be executed until after it has been measured. To further protect the integrity of the measurements, hash measurements are not directly written to PCRs, but rather a PCR is "extended" with a measurement. This means that the TPM takes the current value of the PCR and the measurement to be extended, hashes them together, and replaces the content of the PCR with that hash result. The effect is that the only way to arrive at a particular measurement in a PCR is to extend exactly the same measurements in exactly the same order. Therefore, if any module being measured has been modified, the resulting PCR measurement will be different and thus it is easy to detect if any code, configuration, data, etc. that has been measured had been altered or corrupted. A TPM_Extend command adds a new measurement to a PCR. One PCR register, identified as PCR0, is configured to store a hash corresponding to execution of BIOS code.

A hash, as used herein, is a value generated using a cryptographic hash function, such as a Federal Standard Secure Hash Algorithm (SHA). Cryptographic hash functions are mathematical operations run on digital data. My comparing a computed hash to an expected hash value, one can validate the integrity of the digital data.

As disclosed herein, the value that is generated and stored at PCR0 during initialization of information handling system 100 can be generated in advance by an OEM or by a distributor of firmware image 112. The pre-calculated PCR0 value can be packaged along with the corresponding BIOS update, and distributed to users of system 100.

Figure 2:
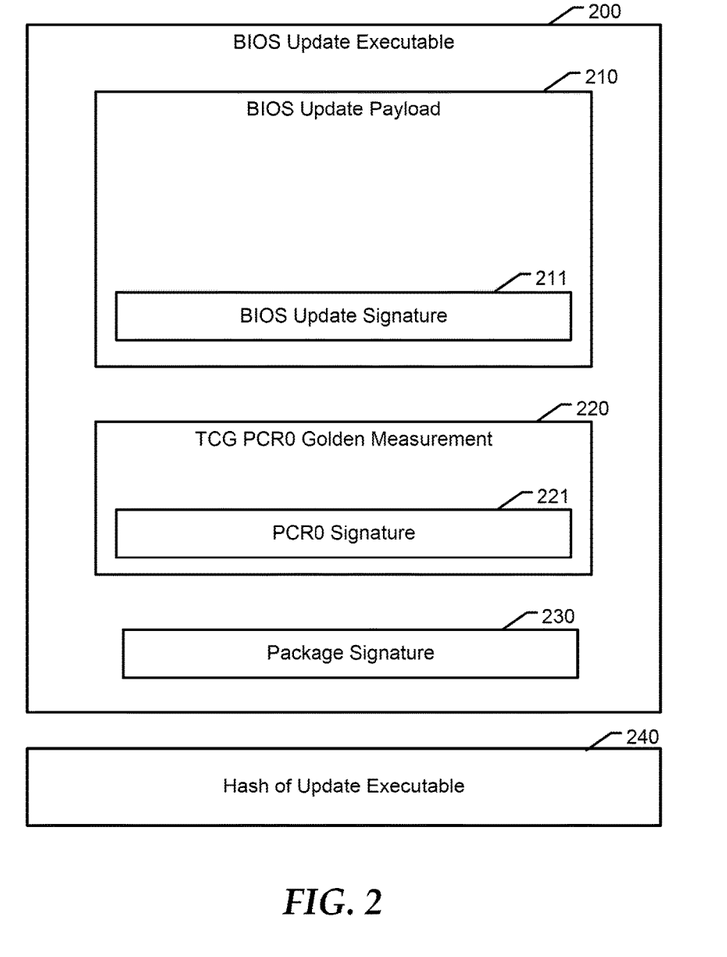
FIG. 2 is a block diagram illustrating a BIOS update executable according to a specific embodiment of the present disclosure.

FIG. 2 is a block diagram illustrating a BIOS update executable 200 according to a specific embodiment of the present disclosure. Executable 200 encapsulates a BIOS update payload 210 and a TCG PCR0 golden measurement 220. In an embodiment, executable 200 can include a BIOS update signature 211 corresponding to BIOS update payload 210, a PCR0 signature 221 corresponding to PCR0 golden measurement 220, and a package signature 230 corresponding to the entire executable 200. A hash 240, generated based on the entire update executable 200, can be provided to users to further validate the authenticity of the BIOS update package 200.

BIOS update executable 200 is a program file that can be executed by information handling system 100 to update firmware image 112. In addition, executable 200 can be parsed to extract PCR0 golden measurement 220. In an embodiment, a user can execute a verification program or a command-line command that extracts PCR0 measurement 220 from executable 200 and, optionally, compares the extracted PCR0 value with the value generated by TPM 120 that is stored at PCR 122. Signatures 211, 221, and 230 can be based on the public key infrastructure (PKI), or another type of digital certification. PKI is a set of hardware, software, policies, and procedures needed to create, manage, distribute, use, store, and revoke digital certificates and manage public-key encryption. The purpose of a PKI is to facilitate the secure electronic transfer of information for a range of network activities such as e-commerce, internet banking and confidential email. It is required for activities where simple passwords are an inadequate authentication method and more rigorous proof is required to confirm the identity of the parties involved in the communication and to validate the information being transferred. A PKI is an arrangement that binds public keys with respective user identities by means of a certificate authority. While multiple signatures are illustrated at executable 200, one of skill will appreciate that a fewer or a greater number of signatures can be included. For example, in one embodiment executable 200 can include only package signature 230.

Figure 3:
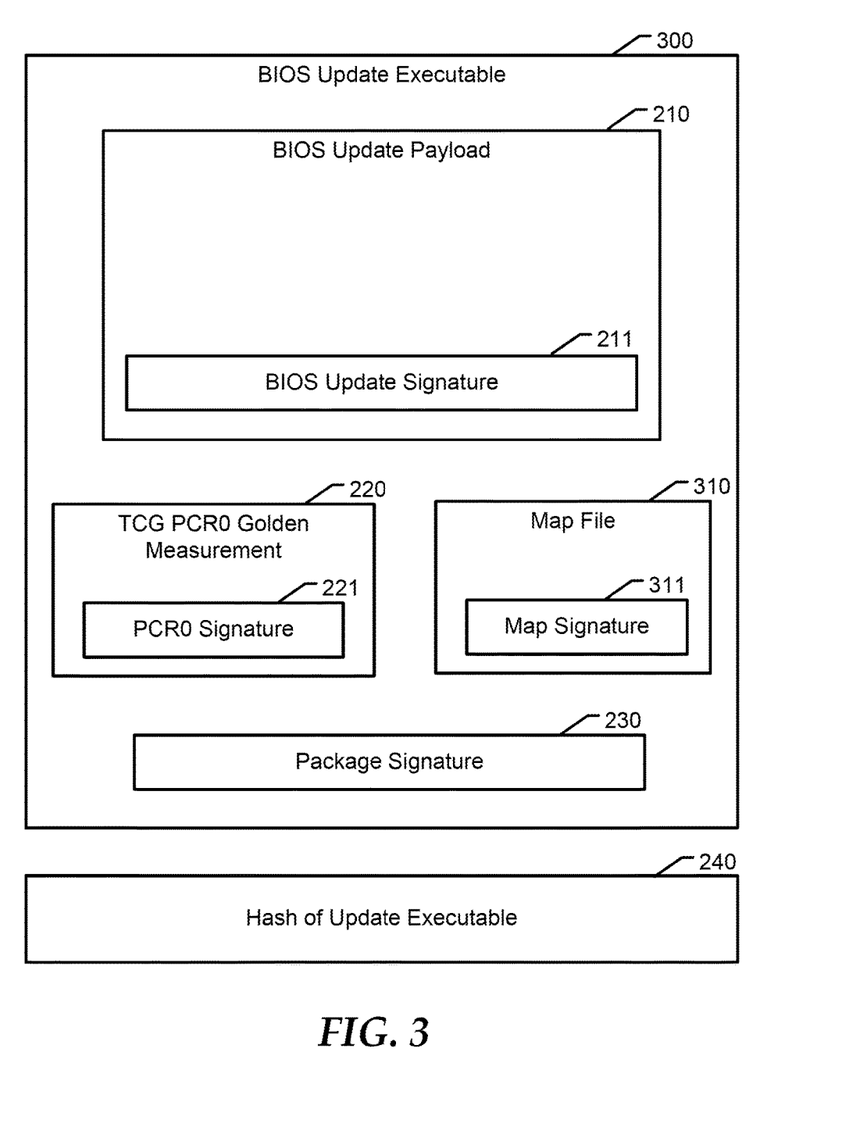
FIG. 3 is a block diagram illustrating a BIOS update executable according to another embodiment of the present disclosure.

FIG. 3 is a block diagram illustrating a BIOS update executable 300 according to another embodiment of the present disclosure. Executable 300 is similar to executable 200, but also includes a map file 310 and a corresponding map signature 311. Map file 330 includes one or more range descriptors and corresponding hashes. Each range descriptor identifies a physical address range of firmware image 112 included in BIOS update payload 210. A hash is generated based on firmware code included in the corresponding address range. Map signature 311 can include a digitally signed statement attesting to the identity of the supplier of map file 310.

Figure 4:
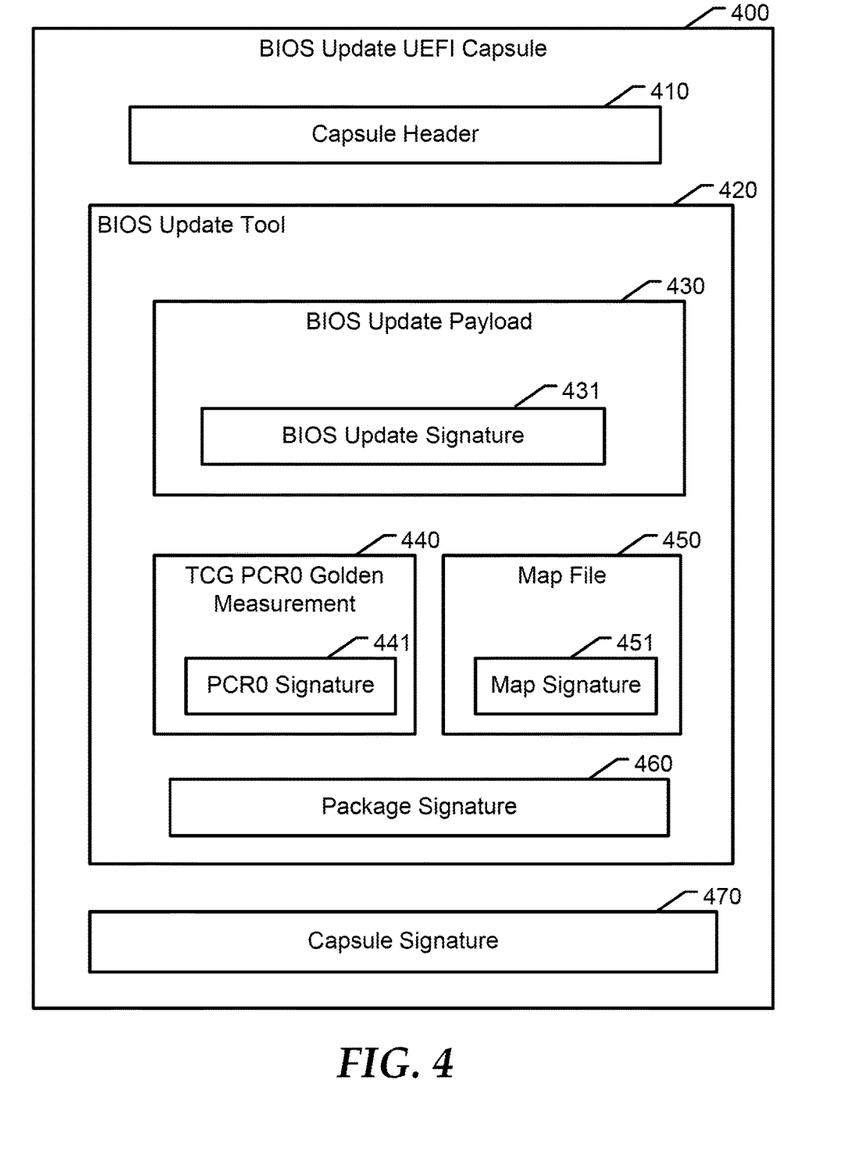
FIG. 4 is a block diagram illustrating a BIOS update UEFI firmware management capsule according to a specific embodiment of the present disclosure.

FIG. 4 is a block diagram illustrating a BIOS update UEFI firmware management capsule 400 according to a specific embodiment of the present disclosure. UEFI firmware management capsule 400 is similar to executable 300, but represents an alternate form of encapsulation. In particular, UEFI firmware management capsule 400 is compliant with the Firmware Management protocol provided by the UEFI specification. UEFI firmware management capsule 400 includes a capsule header 410 and a BIOS update tool 420. Update tool 420 includes a BIOS update payload 430 and a corresponding BIOS update signature 431, a TCG PCR0 golden measurement 440 and a corresponding PCR0 signature, a map file 450 and a corresponding map signature 451, and a package signature 460.

A runtime service provided by the UEFI system, Update Capsule( ), can extract the BIOS update payload and facilitate installation of the updated BIOS code at firmware memory 110. Furthermore, a verification program or command can be used to extract PCR0 golden measurement 440 and/or map file 450 from capsule 400, and the extracted measurement can be used to validate the updated BIOS image 112 that was installed from capsule 400. As described above, each of components 430, 440, and 450 can have a corresponding signature to individually verify authenticity of each component. Similarly, package signature 460 can be used to verify authenticity of the encapsulated update tool 420. Finally, capsule signature 470 can provide authentication of the UEFI capsule.

Figure 5:
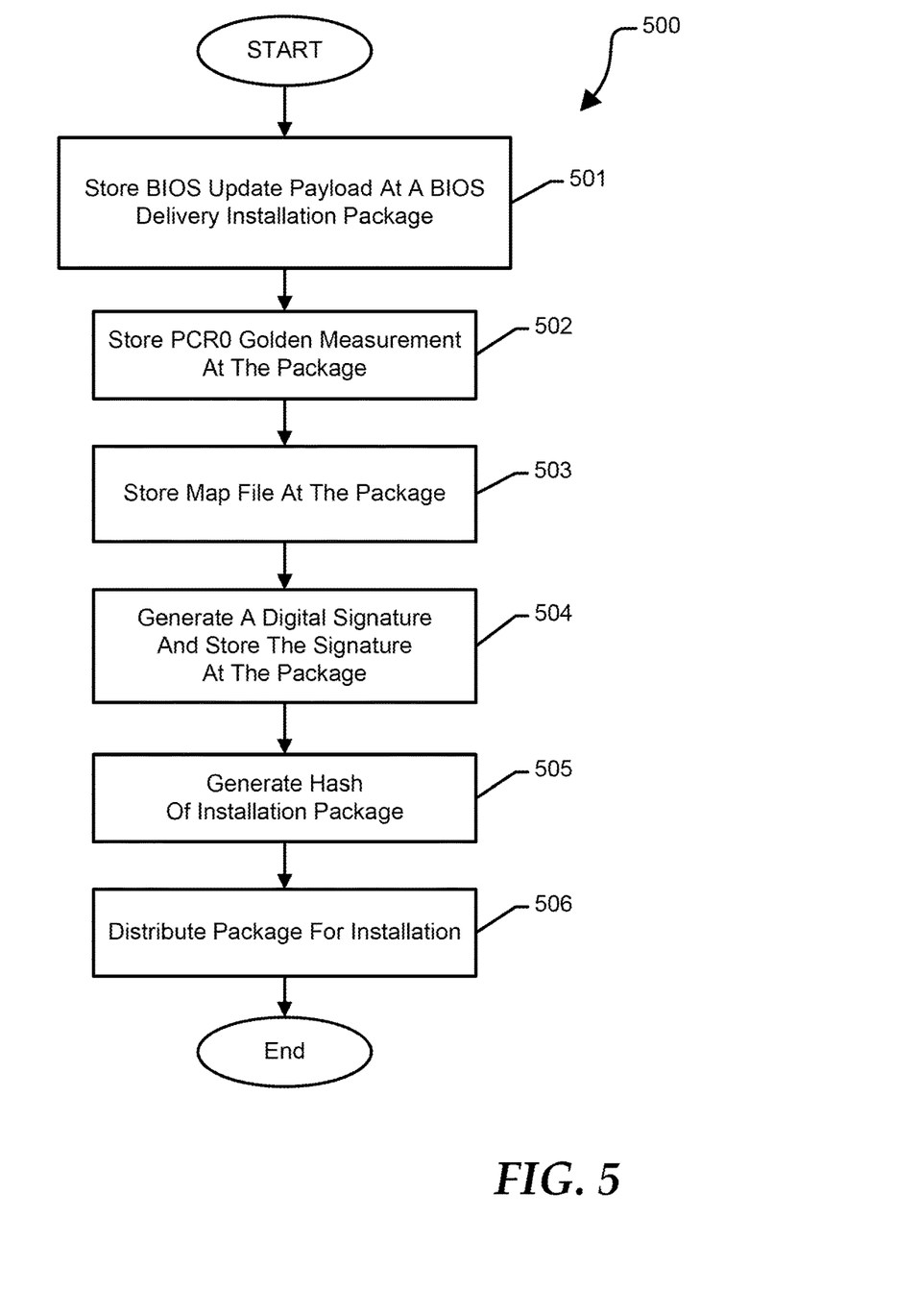
FIG. 5 is a flow diagram illustrating a method for deploying a BIOS integrity measurement via a BIOS update package according to an embodiment of the present disclosure.

FIG. 5 is a flow diagram illustrating a method 500 for deploying a BIOS integrity measurement via a BIOS update package according to an embodiment of the present disclosure. Method 500 would typically be performed by a supplier of BIOS software, such as an OEM. The method begins at block 501 where a BIOS update payload is stored at a BIOS delivery installation package. For example, a BIOS code supplier can provide BIOS update executable 200 containing BIOS update payload 210. The method continues at block 502 where a PCR0 golden measurement is stored at the package. For example, the supplier can generate a TCG PCR0 golden measurement based on code included at payload 210, and store the generated measurement at the executable 200. The method proceeds to block 503 where a map file is stored at the package. As described above with reference to FIG. 3, a map file provides a hash corresponding to a portion of firmware image 112, the portion identified by an address range descriptor. The map file can include one or more range descriptors and corresponding hashes.

Method 500 continues at block 504 where a digital signature is generated and stored at the package. For example, the supplier of executable 300 can provide a digital signature so that the recipient of the update can authenticate the source of the update package. The method proceeds to block 505 where a hash of the installation package can be generated. For example, the supplier of the BIOS update image can generate a hash of the entire executable 300 and make the hash available to recipients of the BIOS update. Upon receipt of executable 300, a user can calculate a hash of the received update and compare the calculated hash to the hash generated by the supplier. If the user's hash matches the supplier's hash, the user can be confident that the executable 300 has not been tampered with by a malicious entity and that the package is the intended BIOS version. The method completes at block 506 where the BIOS delivery installation package is distributed to users. For example, the installation package can be made available for downloading at the supplier's web site.

Figure 6:
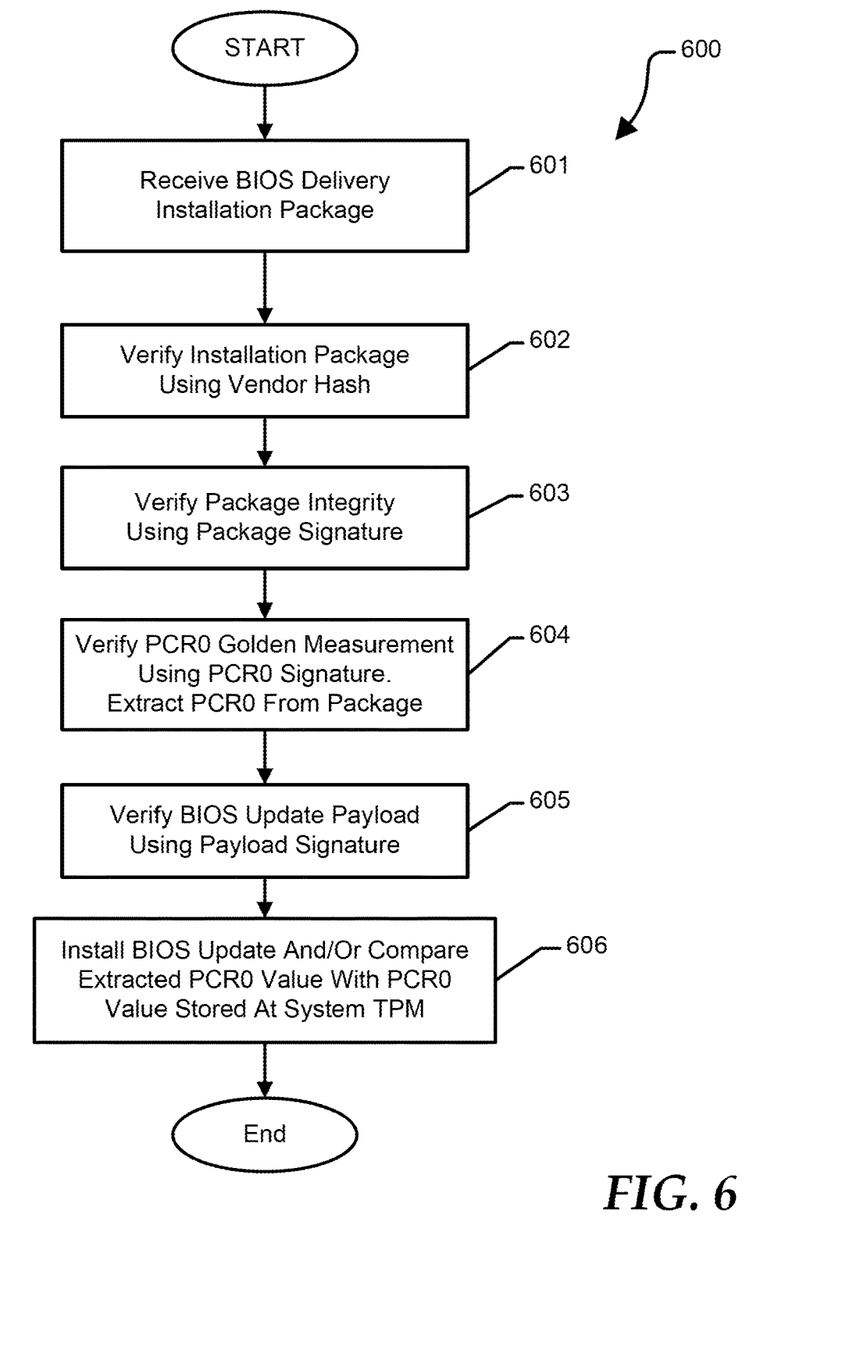
FIG. 6 is a flow diagram illustrating a method for verifying BIOS software using an integrity measurement included in a BIOS update package according to an embodiment of the present disclosure.

FIG. 6 is a flow diagram illustrating a method 600 for verifying BIOS software using an integrity measurement included in a BIOS update package according to an embodiment of the present disclosure. Method 600 is typically performed by a recipient of the BIOS update package. For example, the supplier can provide a software program, which when executed by a user, verifies the authenticity of the BIOS installation package, and parses the package to extract a PCR0 golden measurement that is included in the package. The method begins at block 601 where a BIOS delivery installation package is received. For example, a user of information handling system 100 can download executable 300 or UEFI firmware management capsule 400 for a supplier's website. The method continues at block 602 where the installation package is verified using a hash provided by the vendor of the package. The method proceeds to block 603 where the integrity of the installation package can be further verified using a digital signature. For example, executable 300 can be digitally signed based on security certificates provided by the BIOS supplier.

The method continues at block 604 where the PCR0 golden measurement that is included in the installation package can be verified using a corresponding PCR0 signature stored at a TPM. The verified PCR0 measurement can be extracted from the package. For example, executable 300 includes PCR0 measurement 220 and PCR0 signature 221. A parsing program can verify authenticity of the PCR0 measurement included at the package, and optionally extract the PCR0 value. The method continues at block 605 where the BIOS update payload can be verified using a payload signature included in the package. For example, BIOS update signature 211 can be used to validate the authenticity of BIOS update payload 210. The method completes at block 606 where the BIOS update image included at the installation package can be installed. In addition, the extracted PCR0 measurement can be compared to the contents of the PCR0 register at TPM 120 after initialization of system 100 has completed. One of skill will appreciate that not all steps shown at method 600 may be completed. In addition, more than one application program may be utilized to perform these steps. For example, execution of package 300 can verify the BIOS update payload and install the updated BIOS image, while execution of a second executable can extract PCR0 golden measurement 220 and compare the extracted measurement to the PCR0 value generated by TPM 120 and stored at PCR 122.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for updating basic input/output (BIOS) firmware at an information handling system, the method comprising:
   incorporating, by a data processing device, a BIOS update payload at a BIOS delivery installation package, the BIOS update payload including a complete BIOS image to be stored at a firmware memory at the information handling system; and
   incorporating a first hash at the BIOS delivery installation package, the first hash generated based on a first portion of a BIOS image included at the BIOS update payload.

2. The method of claim 1, wherein the first hash is compliant with a Trusted Computing Group Platform Configuration Register Zero (PCR0) measurement.

3. The method of claim 1, further comprising incorporating a cryptographic signature corresponding to the first hash at the BIOS delivery installation package.

4. The method of claim 1, further comprising:
   receiving the BIOS image; and
   generating the first hash, the first portion corresponding to BIOS instructions.

5. The method of claim 1, further comprising:
   providing an executable computer program to parse the installation package and to extract the first hash from the BIOS delivery installation package.

6. The method of claim 1, further comprising:
   identifying information included at a first address range of a BIOS image;
   generating a second hash of information stored at the first address range;
   incorporating an indicator identifying the first address range at the installation package; and
   incorporating the second hash at the BIOS delivery installation package.

7. The method of claim 1, wherein the BIOS delivery installation package comprises an executable program.

8. The method of claim 1, wherein the BIOS delivery installation package comprises a Unified Extensible Firmware Interface update capsule.

9. A method for updating basic input/output (BIOS) firmware at an information handling system, the method comprising:
   receiving a BIOS delivery installation package, the BIOS delivery installation package including a BIOS update payload and a first hash, the BIOS update payload including a complete BIOS image to be stored at a firmware memory at the information handling system, the first hash generated based on a first portion of the BIOS image; and
   parsing, using a data processing device at the information handling system, the BIOS delivery installation package to extract the first hash.

10. The method of claim 9, wherein the first hash is compliant with a Trusted Computing Group Platform Configuration Register Zero (PCR0) measurement.

11. The method of claim 9, further comprising validating authenticity of the first hash using a cryptographic signature included at the BIOS delivery installation package.

12. The method of claim 9, further comprising:
   parsing the BIOS delivery installation package to extract an indicator identifying a first address range of the BIOS image; and
   parsing the BIOS delivery installation package to extract a second hash generated based on information included at the first address range.

13. The method of claim 9, wherein the BIOS delivery installation package comprises an executable program.

14. The method of claim 9, wherein the BIOS delivery installation package comprises a Unified Extensible Firmware Interface update capsule.

15. A computer readable device for storing a basic input/output system (BIOS) delivery installation package to update BIOS firmware at a firmware memory at an information handling system, the package comprising:
   an update payload at the BIOS delivery installation package, the update payload including a complete BIOS image to be stored at the firmware memory; and
   a first hash generated based on a first portion of the BIOS image included at the update payload, and the first hash is incorporated at the BIOS delivery installation package.

16. The computer readable device of claim 15, wherein the first hash is compliant with a Trusted Computing Group Platform Configuration Register Zero (PCR0) measurement.

17. The computer readable device of claim 15, the package further comprising a cryptographic signature corresponding to the first hash at the BIOS delivery installation package.

18. The computer readable device of claim 15, the package further comprising:
   an indicator identifying a first address range of the BIOS image at the BIOS update payload; and
   a second hash generated based on information stored at the first address range.

19. The computer readable device of claim 15, wherein the BIOS delivery installation package comprises an executable program.

20. The computer readable device of claim 15, wherein the BIOS delivery installation package comprises a Unified Extensible Firmware Interface update capsule.

* * * * *